United States Patent [19]
Serpelloni et al.

[11] Patent Number: 5,601,866
[45] Date of Patent: Feb. 11, 1997

[54] SUGAR-BASED HARD BOILED SWEET AND PROCESS FOR ITS MANUFACTURE

[75] Inventors: Michel Serpelloni, Les Bethune; Guillaume Ribadeau-Dumas, Lambersart, both of France

[73] Assignee: Roqueyye Freres, Lestrem, France

[21] Appl. No.: 470,464

[22] Filed: Jun. 6, 1995

[30] Foreign Application Priority Data

Dec. 26, 1994 [FR] France ................................ 94 15648

[51] Int. Cl.$^6$ .................................................. A23G 3/00
[52] U.S. Cl. .......................................... 426/660; 426/658
[58] Field of Search ................................ 426/660, 658, 426/602, 572

[56] References Cited

U.S. PATENT DOCUMENTS

| | | | |
|---|---|---|---|
| 3,826,857 | 7/1974 | Horn et al. | 426/660 |
| 3,876,794 | 4/1975 | Rennhard | 426/660 |
| 4,452,825 | 6/1984 | Klacik et al. | 426/658 |
| 4,627,980 | 12/1986 | Lynch | 426/660 |
| 4,710,398 | 12/1987 | Holmgren et al. | 426/660 |
| 4,753,816 | 6/1988 | Vink et al. | 426/660 |
| 5,017,400 | 5/1991 | Olinger | 426/660 |
| 5,314,708 | 5/1994 | Gonze et al. | 426/660 |
| 5,424,418 | 6/1995 | Duflot | 536/103 |

FOREIGN PATENT DOCUMENTS

| | | |
|---|---|---|
| 2086204 | 9/1993 | Canada . |
| 2086206 | 9/1993 | Canada . |
| 2086207 | 9/1993 | Canada . |
| 03684561 | 5/1990 | European Pat. Off. . |
| 0377278 | 7/1990 | European Pat. Off. . |
| 0530995 | 3/1993 | European Pat. Off. . |
| 1420929 | 11/1965 | France . |
| 1295006 | 11/1972 | United Kingdom . |
| 1349492 | 4/1974 | United Kingdom . |

*Primary Examiner*—Jeanette Hunter
*Attorney, Agent, or Firm*—Larson & Taylor

[57] ABSTRACT

The invention relates to a new boiled sweet characterized in that it has a high water content and in that it contains, on a dry matter basis, less than 35% of sucrose and more than 65% of a composition of carbohydrates other than sucrose, and in that it has a glass transition temperature, measured for a specific water content, at least equal to 38° C. The invention also relates to a process for the manufacture of this boiled sweet.

30 Claims, No Drawings

SUGAR-BASED HARD BOILED SWEET AND PROCESS FOR ITS MANUFACTURE

The present invention relates to a new boiled sweet having a water content greater than the usual contents for this type of confectionery and having, in spite of this high water content, a very high stability.

The invention also relates to a process for the manufacture of this boiled sweet and the use, during its production, of a special carbohydrate composition.

Boiled sweets, also commonly called hard sweets or hard boiled candies, are solid and essentially amorphous confectionery products. They are obtained by extensive dehydration of carbohydrate syrups. Generally, mixtures of powdered sucrose and of concentrated syrups of starch hydrolysates, in proportions ranging from 40/60 to 65/35 by commercial weight, are boiled. These mixtures normally contain water in sufficient quantity to dissolve the sucrose crystals entirely. These mixtures are then boiled at temperatures of up to 130°–150° C. at ambient pressure so as to evaporate most of the water, then the boiling is completed under vacuum so as to further reduce the water content and to bring it to a value which is normally less than 3%. The plastic mass thus obtained is then cooled until a temperature of between 125° and 140° C. is obtained in the case of a process for casting into moulds, or a temperature of between 90° and 115° C. in the case of a process for forming on rolls or an extrusion process. At this stage, various substances such as flavourings, colourings, intense sweeteners, acids, plant extracts, vitamins and pharmaceutical active ingredients are then added. Boiled sweets having a texture and an appearance similar to those of glass are obtained after forming or casting of the massecuite and after returning to room temperature.

Boiled sweets are required to be stable over time, that is to say to vary as little as possible from the time when they are manufactured up to the time when they are consumed, so as to remain products which are attractive and pleasant in the mouth.

Now, boiled sweets are unfortunately not stable products from a thermodynamic point of view. The extent of their variation depends essentially on their composition after manufacture, but also on the conditions under which they are preserved.

Firstly, boiled sweets may become sticky products during storage. When they are wrapped, it then becomes difficult or even impossible to remove their wrapping materials before they are consumed. They may also cake without remaining individualized, which is even more troublesome.

This problematic variation towards a sticky and syrupy state can be explained by surface phenomena and/or by depth phenomena.

The origin of the surface phenomena is in the hygroscopic nature of boiled sweets. It is indeed known that boiled sweets, which are in essence practically anhydrous products, always have very low equilibrium relative humidities, substantially lower than the usual ambient relative humidities for storage. This explains why an uptake of water necessarily occurs at the surface of the sweets as soon as they are and remain exposed to air, as is the case for lollipops for example. When this water uptake is sufficiently high, it tends to liquefy the surface of the sweets and to impart on them the characteristics of a syrup, that is to say in particular to impart on them a sticky character. The lower the water content of the boiled sweets, the quicker this variation appears.

The depth phenomena, which therefore do not only relate to the surface but to the entire mass of the sweets, have a thermal origin. More precisely, it is advisable, in order for these phenomena to occur, that the storage temperature slightly exceed the glass transition temperature of the boiled sweet. This notion to which reference is made here is extensively described in the excellent article "La transition vitreuse: incidences en technologie alimentaire" [Glass transition: incidents in food technology] by M. Le Meste and D. Simatos, published in I.A.A. of January/February, 1990. The glass transition temperature is the temperature at which, upon heating, a glassy and solid boiled sweet becomes an amorphous syrupy liquid. This temperature is normally measured by differential scanning calorimetry. It can be very easily understood that a boiled sweet may be subject to a deformation, or even to a complete flow, when its storage temperature is high and supercedes its glass transition temperature. The product which initially has a dry feel becomes sticky. It should be noted that the higher the water content of the boiled sweet in question, the greater the risk of variation of this nature during its storage.

In conclusion, in order to avoid the boiled sweets becoming sticky products upon storage, it has always appeared necessary that their water content be neither too low nor too high.

Secondly, boiled sweets can have the tendency during storage to crystallize in an uncontrolled manner and thereby lose their very attractive glassy appearance, resembling more in this case barley sugars which, as is known, are very different from the confectionery products of interest within the framework of the present invention. This crystallization can occur only at the surface of the sweet or alternatively also at the centre of the sweet.

The surface crystallization unavoidably requires a significant water uptake and corresponds to a stage of additional variation relative to that described above. It also requires a sufficient concentration of crystallizable molecules, in general sucrose molecules, in the liquefied peripheral layer. When these two conditions are met, a crystallization is then observed which occurs from the surface of the sweet towards its centre. This phenomenon, when it is uncontrolled, is known by the name of turning. It makes the sweets completely opaque and white.

The crystallization can also occur very directly at the centre of the boiled sweet if the latter is very high in water or if the storage temperature is very high. Under these conditions, the boiled sweet is then excessively soft and can no longer be considered as a real solid. It is then more a liquid supersaturated with crystallizable molecules whose variation toward a crystalline state is unavoidable and practically spontaneous. Specialists designate this type of crystallization by the term graining.

In the final analysis, in order to avoid the boiled sweets being unstable and becoming, over time, sticky products or alternatively turned or grained products, it has always seemed essential to adjust, on the one hand, their content of water and, on the other hand, their content of crystallizable molecules, that is to say generally their content of sucrose.

These basic recommendations are in most confectionery books but also in a good number of scientific articles. It is for example possible to mention the article by J. KELLEHER et al., "The physico-chemical characteristics of boiled sweets" Scientific and Technology Survey, No. 41, August 1963, BFMIRA, where it was calculated that the water content of a sucrose-based boiled sweet must be necessarily less than 3.2% for it to retain a glassy appearance during storage.

In practice, it happens that the great majority of confectionery manufacturers follow this recommendation on water content which has become established in the mind over time.

Furthermore, the experience of confectionery manufacturers has proved to them, as regards the quantity of sucrose to be introduced in combination with traditional syrups of starch hydrolysates, that the ratio conferring the maximum of stability to the boiled sweets should be close to 50/50 by commercial weight.

It should be noted that the hydrolysates, which are obtained by acid or acid and enzymatic hydrolysis of starch, are still today practically the only syrups used to prepare sugar-based boiled sweets. These syrups have a dextrose equivalent (DE) of between 30 and 42 and a maltose content on a dry basis of between 10 and 35%. It has nevertheless been recommended in the past to use glucose syrups of higher DE and higher in maltose in order to produce boiled sweets containing less than 3 or 4% of water. Reference can for example be made to patents GB 1,349,492 and FR 1,420,929.

For economic reasons, some confectionery manufacturers have been led not to comply with the recommendations established for a long time, which are given above and which relate to the contents of water and of sucrose and have placed on the market boiled sweets with a higher water content, that is to say exceeding the value of 4%, which is considered as abnormally high for this type of confectionery item.

Accordingly, boiled sweets containing 4.0% to 5.3% of water and from 45 to 50% of sucrose are sold especially in France. Such boiled sweets are obtained by boiling mixtures containing powdered sucrose and acid hydrolysates of starch with a DE close to 30 which are present approximately in equal parts on a dry basis. The use of these hydrolysates results in a maltose content of these sweets which is always very low, generally less than 10%. These boiled sweets are unstable by nature and tend very rapidly to grain, consequently becoming opaque and white. Moreover, these sweets which are high in water have relatively low glass transition temperatures, of the order of 36° C., and as a result tend to deform and to become sticky, especially during the summer period.

Other boiled sweets having a water content above 4% are also known. They are sold in particular in the United States and are almost exclusively prepared using starch hydrolysates with a DE of between 38 and 42. Their sucrose and maltose contents represent less than 10% of their commercial compositions. Such boiled sweets are also very unstable. They become, in less than a few days, very sticky when they are exposed to air. Furthermore, their glass transition temperatures, which are very low and close to only 30° C., make them particularly sensitive to variations in temperature.

It has also been proposed in patent U.S. Pat. No. 3,826,857 to prepare weakly hygroscopic boiled sweets containing from 4 to 8% of water and from 15 to 31.5% of maltose using a maltodextrin with a DE of between 5 and 25. Nothing is however said about the thermal stability of these boiled sweets.

Up until now, it seems that no viable solutions exist which make it possible to prepare essentially amorphous boiled sweets which are high in water and are stable. Such products would nevertheless be advantageous in many respects, especially because of the fact that they would be of a lower cost for a quality identical to or even better than that of commercially available products.

The aim of the invention is to overcome the disadvantages of the prior art and to provide a new boiled sweet which satisfies, much better than existing products, the expectations of confectionery manufacturers and the various requirements of practical use, that is to say having a substantially improved storage stability.

At the end of detailed research studies, the merit of the applicant company is to have found that this aim could be achieved and that it was possible, against all expectations, to prepare a boiled sweet which is stable although containing a high water content, that is to say greater than 4%.

This boiled sweet can be described as "stable" since over time it does not tend:
  either to become sticky,
  or to "grain", or to "turn", becoming opaque and white at the surface or at the centre,
  or to deform at the usual summer temperatures in temperate climates.

The applicant company has discovered, surprisingly and unexpectedly, that in order to obtain a stable boiled sweet having an abnormally high water content, it is advisable both to considerably reduce the quantity of sucrose in the confectionery compared with the usual quantities, and to ensure that the glass transition temperature of the sweet, which is necessarily reduced because of the higher water content, is corrected by the appropriate choice of a carbohydrate composition.

In other words, it is essential, for such a boiled sweet to be stable, that it have both a sucrose content of less than 35% and a glass transition temperature at least equal to 38° C., this glass transition temperature being measured at a water content close to 4.5% (it should be remembered, in fact, that the glass transition temperature varies as a function of the water content, this temperature being lowered as the water content increases).

The subject of the invention is therefore a boiled sweet characterized in that it has:
  a water content higher than 4%,
  less than 35% sucrose and more than 65% of a composition of carbohydrates other than sucrose, these contents being expressed on a dry matter basis,
  and a glass transition temperature at least equal to 38° C., this glass transition temperature being measured at a water content of about 4.5%.

The invention relates to a boiled sweet characterized in that it contains more than 4% of water, in that it contains, relative to its dry matter content, less than 35% of sucrose and more than 65% of a composition of carbohydrates other than sucrose, and in that it has a glass transition temperature at least equal to 38° C., this temperature being measured for a water content of about 4.5%.

Advantageously, this sugar-based boiled sweet contains more than 4.2%, preferably more than 4.5%, and still more preferably more than 4.8% of water. Thus, it may be advantageously manufactured by boiling at a temperature which is not very high.

The applicant company has discovered that the depressive effect caused by an increase in the water content on the glass transition temperature could be overcome by a judicious choice of a composition of carbohydrates other than sucrose. This composition is present in an amount of at least 65% of the dry matter content of the boiled sweet in accordance with the invention, should be suitable for conferring on the boiled sweet a glass transition temperature greater than 38° C. for a residual water content of about 4.5% and even better, greater than 38° C. for the effective water content of the boiled sweet. The effective water content corresponds to the final water content of the boiled sweet at the end of manufacture.

In concrete terms, this carbohydrate composition can be chosen from glucose syrups with a DE (dextrose equivalent) greater than or equal to 44 containing less than 10%, and preferably less than 5%, of monosaccharides such as D-glucose or fructose. These syrups are preferably syrups with an average maltose content. Indeed, it has been observed that when these syrups have very high maltose contents, between 75 and 90%, the boiled sweets obtained are rather hygroscopic and are subject to breaking during wrapping. Furthermore, it is more difficult with these syrups to produce boiled sweets having a glass transition temperature exceeding 38° C. when they have, in accordance with the invention, a particularly high water content. Accordingly, syrups containing from 45 to 75% of maltose, more preferably from 45 to 56% of maltose, and still more preferably from 48 to 52% of maltose are preferably used according to the invention.

In a surprising and unexpected manner, it has been found that these average maltose contents allowed the microcrystallisation of maltose to be obtained more easily, for the water content of sweets designated according to the invention, than for higher maltose contents. Such maltose syrups can be produced either directly by hydrolysis of starch, especially under the action of a beta-amylase, or indirectly by mixing liquid or solid products, at least one of which is high in maltose.

In this case, the sugar-based boiled sweet in accordance with the invention contains preferably from 35 to 75% of maltose, more preferably from 38 to 65% of maltose and still more preferably from 42 to 50% of maltose relative to its dry matter content.

The carbohydrate composition which can be used according to the invention, may also be constituted, in total or in part, by the said syrups of average maltose content, but hydrogenated. In this case, the sweets obtained are less intensely colored.

The carbohydrate composition capable of being used according to the invention may also be oligosaccharides and polysaccharides which are reputed to be scarcely digestible, that is to say less digestible than are sugars. They may be in particular oligosaccharides and polysaccharides, dextrins, or polyglucoses such as polydextroses, such as those obtained, after hydrogenation or otherwise, according to the process described in patent application EP 561,090 of which the applicant company is proprietor, or alternatively according to the process described in patent application EP 368,451. This is advantageous especially when it is desired to prepare boiled sweets with fewer calories. It is, of course, possible to combine these products and the maltose syrups described above.

On the other hand, the use of maltodextrins and of glucose syrups with a DE less than 44 is in general to be avoided. Indeed, the massecuites thus obtained, with a water content greater than 4%, are difficult to cast or to form because of their very high viscosity but also because of their characteristic of becoming too elastic. Without wishing to be tied to any particular theory, it seems that the problems encountered on the production lines are due to the fact that the products with a DE of less than 44 contain excessively high quantities of very high molecular weight polysaccharides.

The use of carbohydrate compositions containing more than 10% of monosaccharides, which always impart a high hygroscopicity on the boiled sweet, is also avoided.

As regards sucrose, for reasons linked to stability, it is preferred that its content in the boiled sweet, on a dry matter basis, be less than 30%, more preferably less than 25% and still more preferably less than 15%.

Surprisingly and unexpectedly, the applicant has discovered that the reduction of the sucrose content does not significantly lower the sweetness of the boiled sweet in accordance with the invention, especially when syrups with an average maltose or maltitol content are used. It must be noticed that high intense sweeteners, flavors or/and flavor and sweetness enhancers like maltol or ethyl maltol may be used without any problem, to adjust the organoleptic properties of the boiled sweet according to the invention.

Another characteristic of the boiled sweet in accordance with the invention is that it has a water activity greater than that of a customary boiled sweet. Normally, the boiled sweet in accordance with the invention has a water activity greater than 0.30. In the case preferred, that is to say that of sweets having even higher water contents, the water activity is greater than 0.32, or even greater than 0.35.

The applicant company has observed that an even greater stability is obtained by making sure that the glass transition temperature, measured for a water content of about 4.5% and preferably for the effective water content of the boiled sweet, is at least equal to 40° C., the ideal situation being to exceed 43° C. and even better to exceed 45° C.

The boiled sweet in accordance with the invention has several advantages.

It can be manufactured at a lower temperature than normal, which makes it possible to substantially reduce the manufacturing costs but also to limit the time for blocking equipment. In general, the boiling temperatures can be decreased by several degrees. Very often, this reduction is as much as 5° to 10° C. compared with the usual temperatures.

It has been observed, moreover, that in the great majority of cases, the massecuites are less viscous at a high temperature than the conventional massecuites for sugar-based sweets. Consequently, the manufacture by casting proves to be at least as easy as for the customary formulations.

The boiled sweet in accordance with the invention is moreover not very hygroscopic. It has been observed that the rates of water uptake from the ambient atmosphere are lower than those of traditional boiled sweets from the first few days following manufacture and that crystallization is subsequently possible. This is the case in particular during the use of maltose or maltitol syrups, and especially, unexpectedly, during the use of syrups having an average maltose or maltitol content, that is to say a content of 45% to 77% relative to the dry composition. The crystallization remains in all cases invisible to the naked eye, such that the boiled sweet has the advantage of remaining completely transparent.

The boiled sweet in accordance with the invention also tends to be very light in colour. This appears to be explained in particular by the presence of a quantity of inversion products of sucrose which is substantially less than those usually found for this type of confectionery.

Finally, the boiled sweet in accordance with the invention is very stable to temperature and does not tend to run or to deform at summer temperatures in our temperature climate.

The invention also relates to a process for the preparation of a new stable boiled sweet, although containing more water than normal. This process is characterized in that it comprises the preparation of a syrup containing on a dry basis less than 35% of sucrose and more than 65% of a composition of carbohydrates other than sucrose which is suitable for conferring on the boiled sweet a glass transition temperature, measured for a water content of about 4.5%, at least equal to 38° C. It is also characterized in that it comprises the boiling of the syrup thus prepared at a temperature sufficient to allow the vitrification of a massecuite containing more than 4%, preferably more than 4.2% and more preferably more than 4.5% of water.

The other unit operations for the manufacture of the new boiled sweet may be identical to those normally carried out. Accordingly, the boiled sweet can be equally well shaped by known casting, forming or extrusion techniques, after the addition of intense sweeteners, coloring agents, flavoring agents or other substances.

It should be stated that the quantity of water to be added in order to prepare the carbohydrate syrup intended for the manufacture of the sugar-based boiled sweet of the invention can be advantageously substantially reduced compared to the usual quantities, taking into account the use of a smaller quantity of sucrose compared to normal.

The invention will be understood more clearly in the light of the following examples which are intended to be illustrative of the invention and not limitative.

EXAMPLE 1

Comparison of the stability of various sugar-based boiled sweets.

Several sugar-based boiled sweets are prepared by boiling the following mixtures all having an initial dry matter content close to 75%:

a first mixture composed on a dry basis of 50% of sucrose and of 50% of a glucose syrup with a DE close to 30, which is marketed by the applicant under the name ROCLYS® C30 (mixture M1), a second mixture composed, on a dry basis, of 50% of sucrose and of 50% of a glucose syrup with a DE close to 42, which is marketed by the applicant under the name ROCLYS® A42 (mixture M2), a third mixture composed, on a dry basis, of 50% of sucrose and of 50% of a syrup with a DE close to 47, which is marketed by the applicant under the name FLOLYS® C47 (mixture M3). This syrup contains, on a dry basis, between 48 and 52% of maltose, and finally a fourth mixture composed, on a dry basis, of 20% of sucrose and of 80% of the glucose syrup FLOLYS® C47 above (mixture M4).

These four mixtures are boiled on a naked flame, at a chosen temperature, between 135° and 145° C., so as to obtain sugar-based boiled sweets containing about 4.5% of water. For simplicity, the products obtained from mixtures M1, M2, M3 and M4 are called B1, B2, B3 and B4 respectively.

Boiled sweets are also prepared from mixture M2 but by carrying out the boiling at 155° C. on a naked flame so as to obtain a residual water content close to 3%. The products thus obtained are called B5.

The characteristics of the various products are the following:

- Boiled sweets B1

| | | |
|---|---|---|
| * Colour: very pale yellow, | | |
| * Composition on a dry basis | D-glucose | 1.5% |
| | Maltose | 6.0% |
| | Sucrose | 50.0% |
| * Glass transition temperature | | 37° C. |
| - Boiled sweets B2 | | |
| * Colour: very pale yellow | | |
| * Composition on a dry basis | D-glucose | 9.0% |
| | Maltose | 7.5% |
| | Sucrose | 50.0% |
| * Glass transition temperature | | 34° C. |
| - Boiled sweets B3 | | |
| * Colour: very pale yellow | | |
| * Composition on a dry basis | D-glucose | 1.5% |
| | Maltose | 25.0% |
| | Sucrose | 50.0% |
| * Glass transition temperature | | 36° C. |
| - Boiled sweets B4 | | |
| * Colour: not coloured | | |
| * Composition on a dry basis | D-glucose | 2.0% |

-continued

| | | |
|---|---|---|
| | Maltose | 40.0% |
| | Sucrose | 20.0% |
| * Glass transition temperature | | 44° C. |
| - Boiled sweets B5 | | |
| * Colour: dark yellow | | |
| * Composition on a dry basis | D-glucose | 9.0% |
| | Maltose | 7.5% |
| | Sucrose | 50.0% |
| * Glass transition temperature | | 48° C. |

The various boiled sweets are stored for 6 months comprising a summer period.

It is observed that after this period, only the boiled sweets B4 and B5 remained unchanged, that is to say did not tend either to become sticky, or to grain or to turn, or to deform.

The boiled sweets B4 in accordance with the invention are as stable as are the control products B5, although they have a higher water content.

EXAMPLE 2

Comparison of the behaviour of various maltose syrups.

Several other sugar-based boiled sweets containing about 4.2% of water and on a dry basis 20% of sucrose only, are prepared. For that, the following mixtures are used:

the mixture M4 of Example 1, a mixture comprising on a dry basis 20% of sucrose and 80% of maltose syrup sold by the applicant under the name FLOLYS® D57 (mixture M6). The dry matter content of this syrup constitutes about 70% of maltose and about 3% of D-glucose, and a mixture comprising on a dry basis 20% of sucrose and 80% of a maltose syrup containing about 92% of maltose and about 4% of D-glucose relative to its dry matter content (mixture M7).

It is observed that the products obtained are all very stable and very clear.

The sweets obtained using the mixture M7 are judged to be more brittle than the sweets containing the mixture M4 or the mixture M6. The latter are preferred because they have a glass transition temperature of between 48° and 50° C. whereas for the first ones this glass transition temperature is only about 41° C.

EXAMPLE 3

Comparison of the viscosities at high temperature of various massecuites.

Boiled sweets are prepared by casting into moulds, using a pilot boiler.

For that, the following are used:

a mixture composed, on a dry basis, of 10% of sucrose and of 90% of FLOLYS® C47 syrup described in Example 1 (mixture M8), only the syrup FLOLYS® C47, and the mixture M1 given in Example 1.

In the three cases, boiling is carried out at about 140° C. with the application of a vacuum, so as to obtain water contents close to 5.0%.

It is observed that the viscosities of the massecuites, measured with the aid of a ROTOVISKO PK100 apparatus using a PK5 1° cone, are, in the case where the mixtures M8 and M1 are used, very similar for a temperature range between 140° and 120° C., and correspond to the usual casting temperatures. The massecuite prepared by the sole use of the FLOLYS® syrup is on the other hand slightly more viscous.

In all cases, it is possible for a casting to be carried out without major difficulties.

Upon storage, the sweets prepared essentially or exclusively with the FLOLYS® syrup prove to be more stable than those composed of the mixture M1. Indeed, the latter, contrary to the first, tend to grain and to become opaque over time.

What is claimed is:

1. Sugar-based hard boiled candy containing, on a dry matter basis, less than 35% of sucrose and more than 65% of a composition of carbohydrates other than sucrose, and having a water content higher than 4% and a glass transition temperature of at least 38° C., said temperature being measured for a water content of about 4.5%.

2. Sugar-based hard boiled candy according to claim 1, containing more than 4.2% of water.

3. Sugar-based hard boiled candy according to claim 2, containing more than 4.5% of water.

4. Sugar-based hard boiled candy according to claim 3, containing more than 4.8% of water.

5. Sugar-based hard boiled candy containing, on a dry matter basis, less than 35% of sucrose and more than 65% of a composition of carbohydrates other than sucrose, and having a water content higher than 4% and a glass transition temperature of at least 38° C., said temperature being measured for its effective water content.

6. Sugar-based hard boiled candy according to claim 5, having a water content higher than 4.2%.

7. Sugar-based hard boiled candy according to claim 6, having a water content higher than 4.5%.

8. Sugar-based hard boiled candy according to claim 7, having a water content higher than 4.8%.

9. Sugar-based hard boiled candy according to claim 1, having a glass transition temperature of at least 40° C., said temperature being measured for a water content of about 4.5%.

10. Sugar-based hard boiled candy according to claim 5, having a glass transition temperature of at least 40° C., said temperature being measured for its effective water content.

11. Sugar-based hard boiled candy according to claim 1, having a glass transition temperature of at least 43° C., said temperature being measured for a water content of about 4.5%.

12. Sugar-based hard boiled candy according to claim 5, having a glass transition temperature of at least 43° C., said temperature being measured for its effective water content.

13. Sugar-based hard boiled candy according to claim 1, having a glass transition temperature of at least 45° C., said temperature being measured for a water content of about 4.5%.

14. Sugar-based hard boiled candy according to claim 5, having a glass transition temperature of at least 45° C., said temperature being measured for its effective water content.

15. Sugar-based hard boiled candy according to claim 1, wherein the composition of carbohydrates other than sucrose is selected from the group consisting of oligosaccharides and polysaccharides which are not very digestible, and glucose syrups having a DE greater than or equal to 44 containing less than 10% of monosaccharides.

16. Sugar-based hard boiled candy according to claim 15, wherein the carbohydrate composition other than sucrose is a syrup containing from 45 to 75% of maltose.

17. Sugar-based hard boiled candy according to claim 16, wherein the carbohydrate composition other than sucrose is a syrup containing from 45 to 56% of maltose.

18. Sugar-based hard boiled candy according to claim 17, wherein the carbohydrate composition other than sucrose is a syrup containing from 48 to 52% of maltose.

19. Sugar-based hard boiled candy according to claim 15, wherein the carbohydrate composition other than sucrose is hydrogenated.

20. Sugar-based hard boiled candy according to claim 5, wherein the composition of carbohydrates other than sucrose is selected from the group consisting of oligosaccharides and polysaccharides which are not very digestible, and glucose syrups having a DE greater than or equal to 44 containing less than 10% of monosaccharides.

21. Sugar-based hard boiled candy according to claim 20, wherein the carbohydrate composition other than sucrose is a syrup containing from 45 to 75% of maltose.

22. Sugar-based hard boiled candy according to claim 21, wherein the carbohydrate composition other than sucrose is a syrup containing from 45 to 56% of maltose.

23. Sugar-based hard boiled candy according to claim 22, wherein the carbohydrate composition other than sucrose is a syrup containing from 48 to 52% of maltose.

24. Sugar-based hard boiled candy according to claim 20, wherein the carbohydrate composition other than sucrose is hydrogenated.

25. Process for the preparation of a stable sugar-based hard boiled candy comprising:
  (a) the preparation of a syrup containing, on a dry matter basis less than 35% of sucrose and more than 65% of a composition of carbohydrates other than sucrose, suitable for conferring on the sugar-based hard boiled candy a glass transition temperature at least equal to 38° C., this temperature being measured for a water content of about 4.5%;
  (b) the boiling of the said syrup at a temperature sufficient to allow the vitrification of a massecuite containing more than 4.0% of water.

26. Process according to claim 25, wherein the boiling of the syrup is performed at a temperature sufficient to allow the vitrification of a massecuite containing more than 4.2% of water.

27. Process according to claim 26, wherein the boiling of the syrup is performed at a temperature sufficient to allow the vitrification of a massecuite containing more than 4.5% of water.

28. Process for the preparation of a stable sugar-based hard boiled candy comprising:
  (a) the preparation of a syrup containing, on a dry matter basis, less than 35% of sucrose and more than 65% of a composition of carbohydrates other than sucrose, suitable for conferring on the sugar-based hard boiled candy a glass transition temperature at least equal to 38° C., this temperature being measured for the effective water content of the boiled sweet;
  (b) the boiling of the said syrup at a temperature sufficient to allow the vitrification of a massecuite containing more than 4.0% of water.

29. Process according to claim 28, wherein the boiling of the said syrup is carried out at a temperature sufficient to allow the vitrification of a massecuite containing more than 4.2% of water.

30. Process according to claim 29, wherein the boiling of the said syrup is carried out at a temperature sufficient to allow the vitrification of a massecuite containing more than 4.5% of water.

* * * * *

UNITED STATES PATENT AND TRADEMARK OFFICE
CERTIFICATE OF CORRECTION

PATENT NO. : 5,601,866
DATED : February 11, 1997
INVENTOR(S) : SERPELLONI et al

It is certified that error appears in the above-indentified patent and that said Letters Patent is hereby corrected as shown below:

Title page: item [73] should read as follows:

--[73] Assignee: Roquette Freres, Lestrem, France--

Signed and Sealed this

First Day of July, 1997

*Attest:*

BRUCE LEHMAN

*Attesting Officer*     *Commissioner of Patents and Trademarks*